No. 731,360. PATENTED JUNE 16, 1903.
F. W. HASTINGS.
MOLDING MACHINE.
APPLICATION FILED APR. 17, 1902.
NO MODEL. 5 SHEETS—SHEET 3.
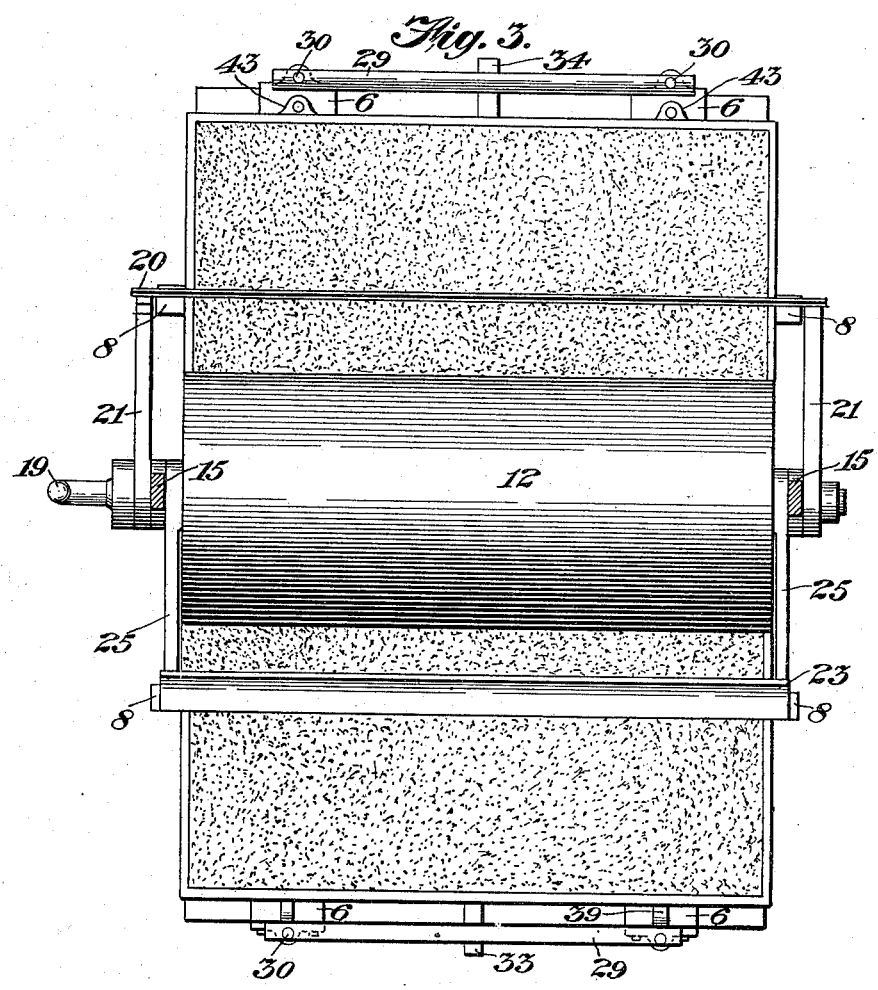
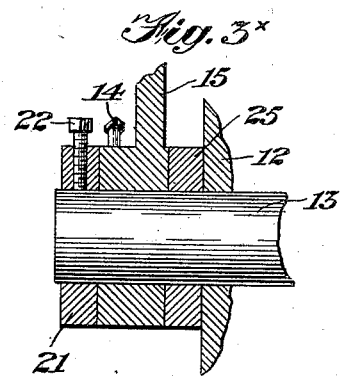
Witnesses: Inventor:
F. W. Hastings
by Elliott & Hopkins attys No. 731,360. PATENTED JUNE 16, 1903.
F. W. HASTINGS.
MOLDING MACHINE.
APPLICATION FILED APR. 17, 1902.
NO MODEL. 5 SHEETS—SHEET 4.
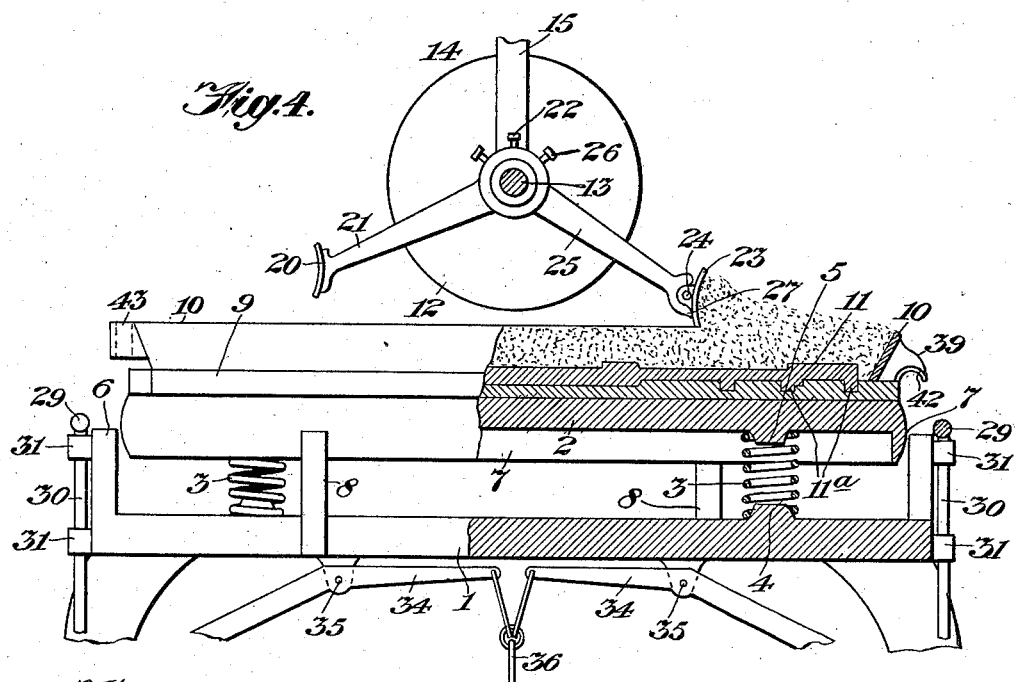
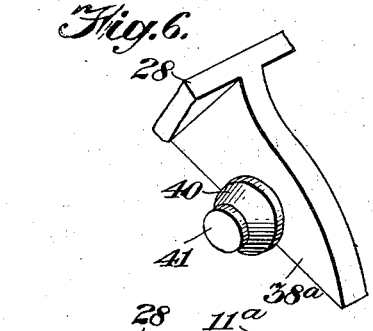
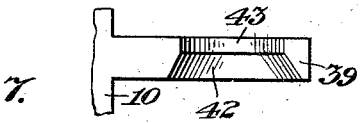
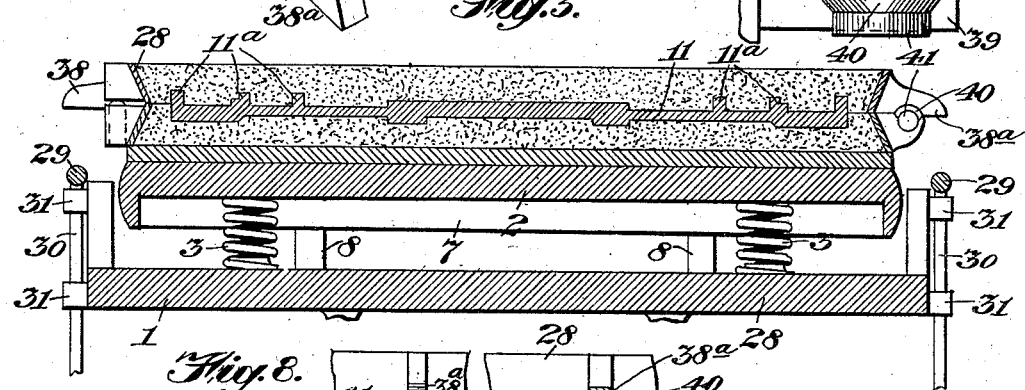
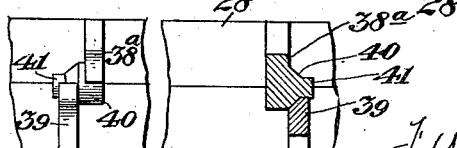
Witnesses:
J B Weir
M B Allstott
Inventor:
F. W. Hastings
by Elliott & Hopkins
attys No. 731,360. PATENTED JUNE 16, 1903.
F. W. HASTINGS.
MOLDING MACHINE.
APPLICATION FILED APR. 17, 1902.
NO MODEL. 5 SHEETS—SHEET 5.
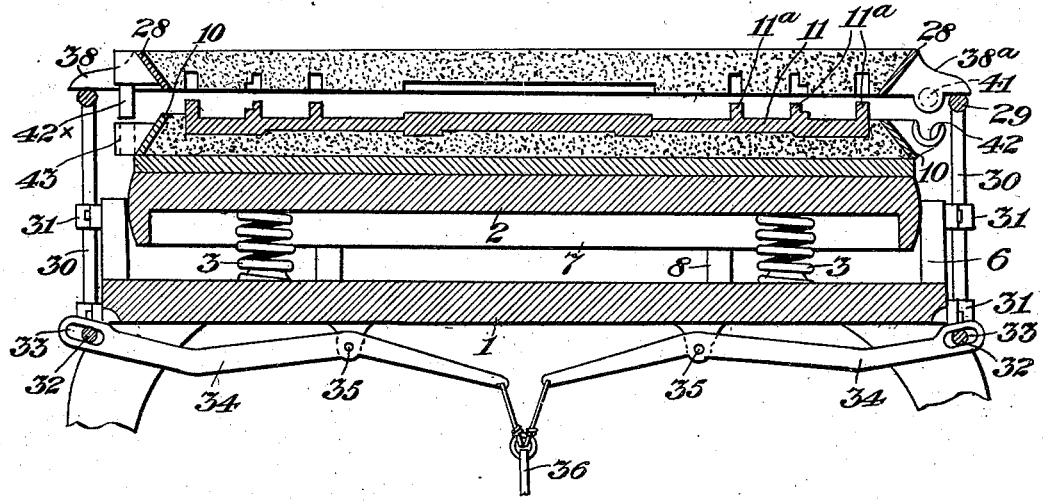
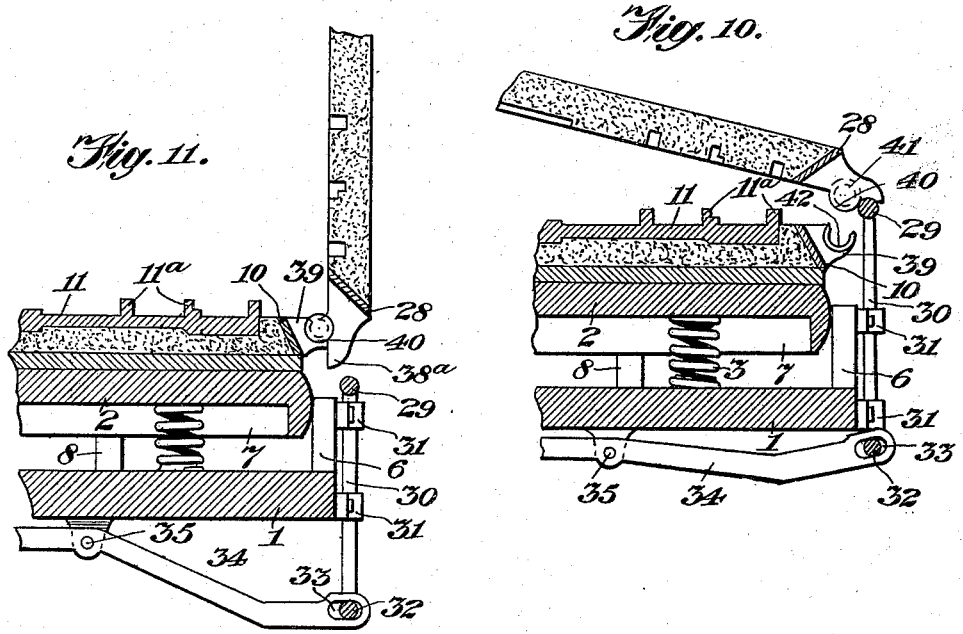
Witnesses:
J. B. Weir
M. B. Alletatt
Inventor:
F. W. Hastings
by Elliott & Hopkins
Attys No. 731,360.

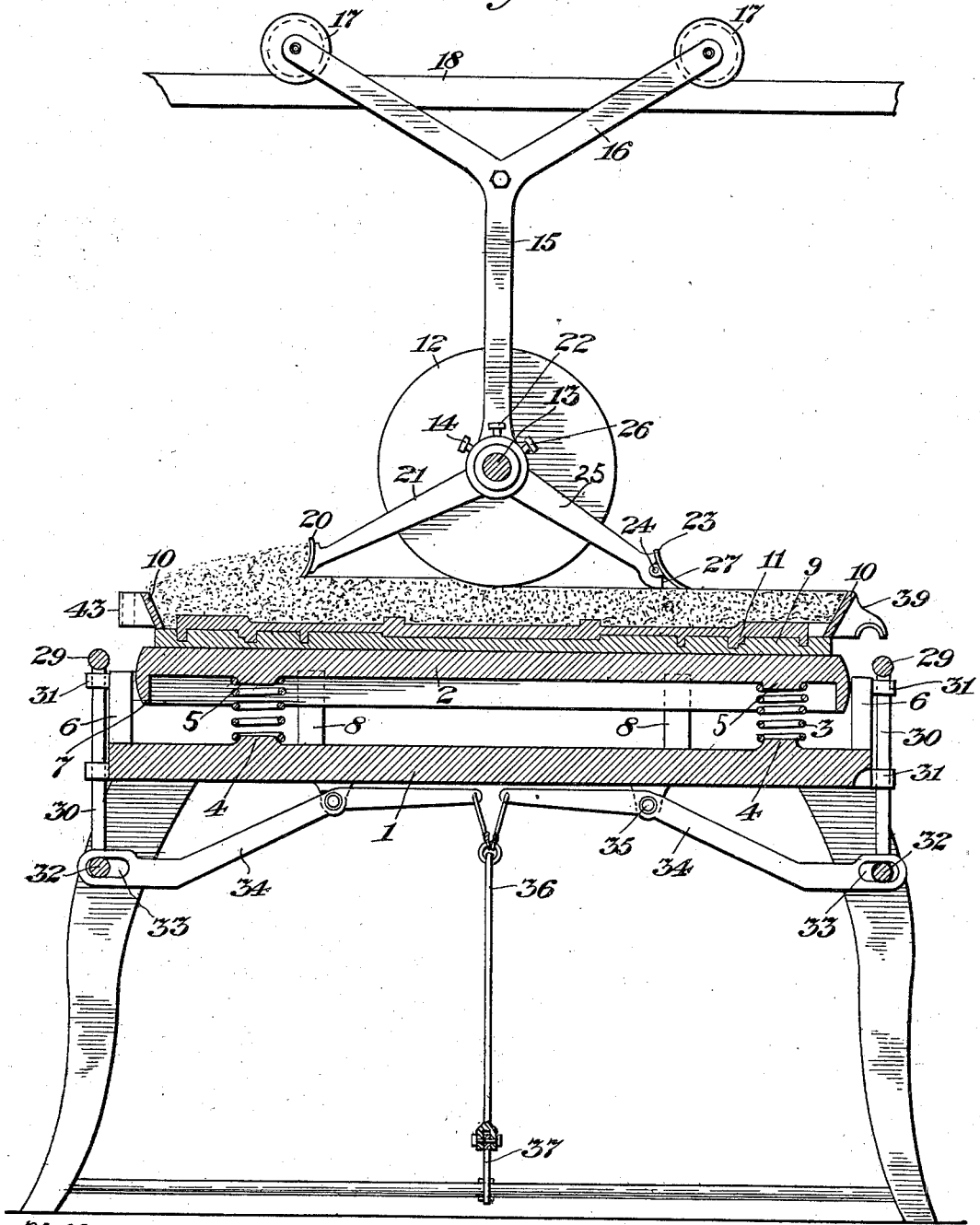

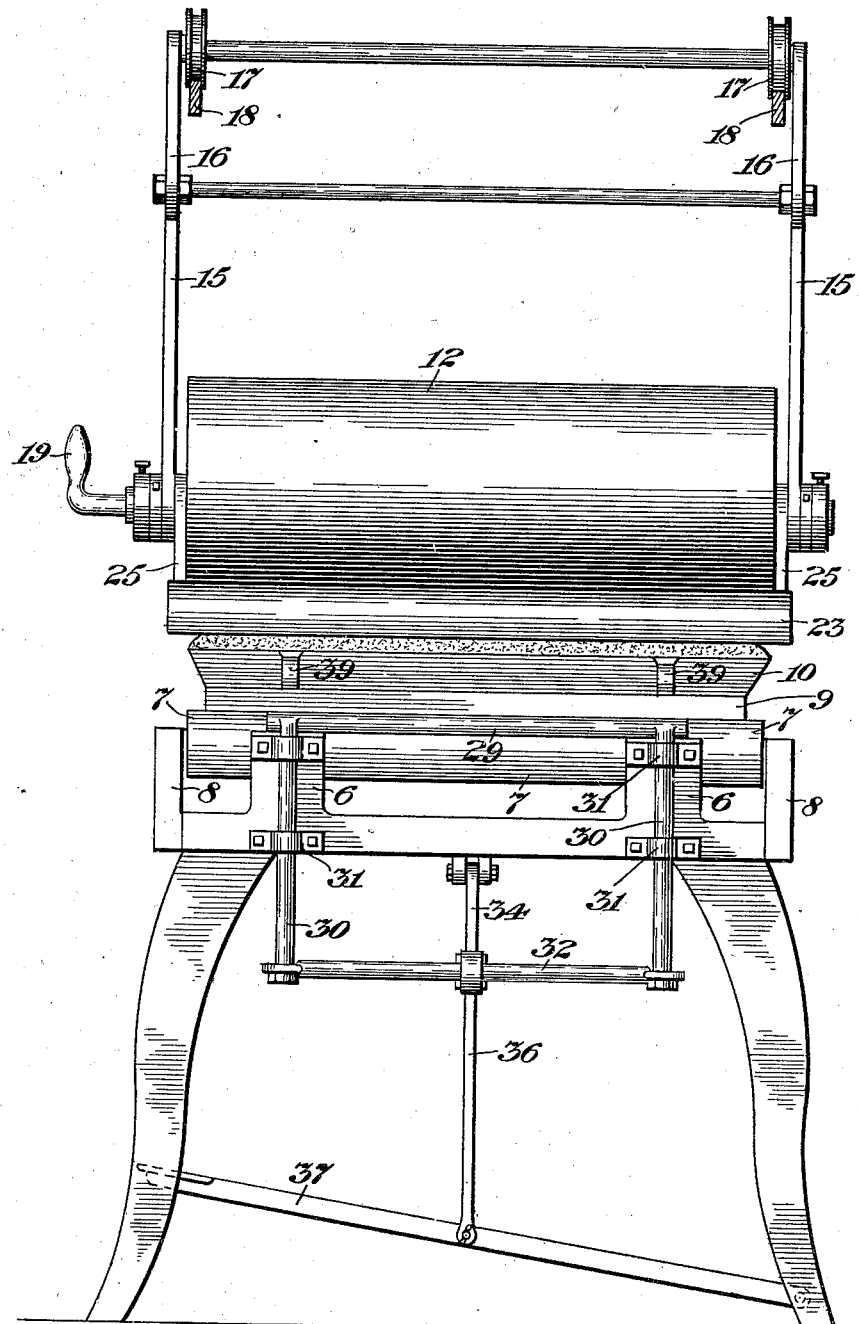

Patented June 16, 1903.

UNITED STATES PATENT OFFICE.

FRED W. HASTINGS, OF BELVIDERE, ILLINOIS, ASSIGNOR TO NATIONAL SEWING MACHINE COMPANY, OF BELVIDERE, ILLINOIS, A CORPORATION OF ILLINOIS.

MOLDING-MACHINE.

SPECIFICATION forming part of Letters Patent No. 731,360, dated June 16, 1903.

Original application filed June 22, 1901, Serial No. 65,576. Divided and this application filed April 17, 1902. Serial No. 103,309. (No model.)

*To all whom it may concern:*

Be it known that I, FRED W. HASTINGS, a citizen of the United States, residing at Belvidere, in the county of Boone and State of Illinois, have invented certain new and useful Improvements in Molding-Machines, of which the following is a full, clear, and exact specification.

My invention relates to machines for making molds, and more particularly to the flasks and means for operating the same.

My present application is a division of my application, Serial No. 65,576, filed June 22, 1901, and the improvements in the flask table or support and the roller shown and described herein, but not claimed, constitute the subject-matter of the claims in my aforesaid application.

The object of the invention is to so improve the flask-hinges that the same shall possess a tendency to drift the upper flask toward its proper position with relation to the bottom one and at the same time will be so formed as to avoid the accumulation of sand and dirt, which prevents the proper registering of the flasks.

With these ends in view my invention consists in certain features of novelty in the construction, combination, and arrangement of parts by which the said objects and certain other objects hereinafter appearing are attained, all as fully described, with reference to the accompanying drawings, and more particularly pointed out in the claims.

In the said drawings, Figure 1 is a vertical longitudinal sectional view of the lower part of my improved molding-machine, the upper portion above the flasks being shown in elevation in the act of simultaneously leveling and rolling the sand in the first flask. Fig. 2 is an end elevation thereof. Fig. 3 is a plan view. Fig. 3× is an enlarged vertical sectional view of one of the trunnions and supports of the roller. Fig. 4 is a view of a portion of the machine, partly in section and partly in elevation, showing the parts as in Fig. 1, but illustrating the roller making its return movement after rolling the sand, as in Fig. 1, and one of the scrapers leveling the sand even with the top or edges of the flask. Fig. 5 is a vertical longitudinal sectional view of the table and two flasks, showing the complete mold with the pattern between the mold members. Fig. 6 is an enlarged detail perspective view of one of the hinge-members of the flasks. Fig. 7 is a plan view illustrating the concave or hook-shaped hinge member on one side and on the other side the two hinge members placed together. Fig. 8 is an end view looking toward the right, as in Fig. 5. Fig. 9 is a view similar to Fig. 5, showing the upper flask lifted perpendicularly away from the lower flask. Fig. 10 is a similar view of one end of the device, showing the upper flask in the act of being turned back preparatory to removing the pattern; and Fig. 11 is a similar view showing the manner of allowing the upper flask-hinge members to again settle back into their hooks or companion members while the upper flask is being turned upwardly from the position shown in Fig. 9 to the position shown in Fig. 11.

1 is a bench or pedestal, which may be of any suitable construction for supporting a table 2 in any manner that will permit the table to yield under pressure, preferably independently at opposite ends. In the example of the invention shown in the drawings the bench 1 is provided on its upper side with a number of cushions or springs 3, whose lower ends are held in place by suitable bosses 4, formed on or secured to the bench, and their upper ends by similar bosses 5, provided on or secured to the under side of the table 2. The table 2 being thus supported at a distance from the bench 1 by independent springs or cushions, it will be seen that it is adapted for yielding bodily and also teetering on an independent axis. In order, however, that the table 2 may be held against longitudinal vibration, the ends of the bench are provided with vertical guides 6, which project upwardly above the lower edge of the table and permit the table to rise and fall and also teeter, while holding it against undue lateral vibration. The edges of the table, if desired, may be provided with a depending flange 7, engaging between the guides 6 and slightly curved to permit of an easy movement of the table on its independent axis, if necessary. The table may be held against lateral oscillation transversely by similar guides 8, secured to the sides of the bench 1 and projecting upwardly beyond the edge of the table or its depending flange 7. This cushioned table 2 is designed for the support of the match-plate, which is shown at 9, and the flasks placed thereover in the usual or any suitable manner, and in the use of the apparatus the match-plate 9 is first laid upon the table, as better shown in Fig. 1, with its imprint turned upwardly in the usual manner, and one of the flasks 10 is then placed upon the match-plate, the pattern 11 having been previously laid in its proper place in the match-plate, and the flask is then filled with sand, which is compressed to the desired degree of density around the pattern by means of a roller 12, supported and guided across the flask in any suitable manner, by hand or by power. In the example of the invention shown in the drawings this roller is provided with an axle 13, rigidly secured by set-screw or other suitable device 14 in two hangers 15, each having bifurcations 16, suspended from trolley-wheels 17, running on overhead rails 18, extending longitudinally of the flasks and parallel with their surfaces, so that as the roller is moved back and forth it will compress the sand in the flask with a uniform density from end to end. The end of the axle 13 may be provided with a handle or grip 19, whereby the roller may be moved back and forth.

In order that the sand may be level in the flask preparatory to passing the roller over it, so that the compression will be uniform throughout the surface of the flask and may also be regulated, the carriage of the roller or some part moving with the roller is provided with a scraper 20, which precedes the roller in its movement across the flask in the manner better shown in Fig. 1, and thus not only levels the sand, but reduces it to a depth or thickness which when compressed to the level of the lower side of the roller will not be too great. This scraper 20 is mounted upon arms 21, which are journaled or pivoted on the axle 13, as better shown in Fig. 3, and held adjustably thereon by means of set-screws 22, so that the depth of the sand may be varied preparatory to the rolling operation.

In the use of the machine the roller 12 should be so positioned with reference to the height of the table 2 and the springs 3 so proportioned in strength and length that the rolling operation will leave a considerable depth of sand above the edge of the flask, thus avoiding the possibility of the roller coming in contact with the edges of the flask, where its compressing action would cease, and in order that this depth of sand left above the edge of the flask may be automatically removed or shaved off even with the edge of the flask after the rolling operation has been completed the opposite side of the roller-carriage is provided with a scraper 23, which is pivoted at 24 to the lower ends of arms 25, rigidly secured to the axle 13 by means of set-screw 26 or any other suitable device that will hold the arms 25 rigidly, while permitting of their adjustment or pivotal movement on the axle 13, if desired. The scraper 23 being loosely pivoted to the arms 25, it will be seen that when the roller travels in one direction—that is to say, in its compressing or rolling movement, as shown in Fig. 1—the lower edge of the scraper, which is more or less rounded, will be deflected upwardly by the surface of the compressed sand; but when the roller makes its return movement, if such movement be required, the lower edge of the scraper will automatically dig into the sand and turn downwardly until its edge engages the upper edge of the flask, whereby it will shave the sand off even with the flask, it being understood that the roller is moved first toward the left, as shown in Fig. 1, a sufficient distance to bring the edge of the scraper 23 at the left-hand edge of the flask and is then moved toward the right until scraper 20 entirely clears the flask and said scraper and the rest of the mechanism carried by the roller-carriage are out of the way of the operator. The downward movement of scraper 23 on its pivot 24 may be limited by shoulder 27 on the end of each of the arms 25.

The operation just described completes one of the mold members, which for the sake of convenience may be termed the "drag." After this has been done a bottom board is laid over the flask 10 in the usual manner, and said flask, together with the match-plate 9, is inverted on the table 2, the bottom board remaining underneath where the match-plate 9 is now situated in the usual manner. (Not necessary to illustrate.) The match-plate 9 is then removed from the pattern 11, leaving the pattern in place in the drag. The upper flask or cope, which is shown at 28 in Fig. 5, is then fitted accurately over the lower flask 10 and filled with sand in any suitable way, after which the roller-carriage is passed over it toward the left, the springs 3 yielding under the extra weight and bringing the level of the upper flask down to approximately the same level as that originally occupied by the lower flask during the operation illustrated in Fig. 1, so that the advance scraper 20 will level the sand of the upper flask 28 in the same manner that it levels the sand of the lower flask, as shown in Fig. 1, and the roller 12 will compress the sand in the upper flask as it compressed the sand in the lower flask, and after the compressing operation or movement has been completed the movement of the roller toward the right will cause the scraper 23 to shave off the sand even with the top of the upper flask in the way it did in operating on the lower flask, as shown in Fig. 4. The two mold members will then be finished, as shown in Fig. 5, and the flasks will be ready for separation in order that the pattern may be removed. Flasks of this character are ordinarily hinged together at one end, so that the upper one may be turned back on its hinges away from the lower one; but this operation or method of separating the flasks to remove the pattern is not feasible where the pattern has features such as the features 11ª, projecting upwardly a considerable distance into the sand of the upper mold member, because this swinging of the mold member on an arc would cause said projecting features of the pattern to tear or damage the mold. According to this invention, therefore, the upper flask is raised perpendicularly with reference to the plane or face of the lower flask in order to clear the projecting feature 11ª of the pattern, and it is then turned back on its hinges, so that when replaced it will accurately match the lower mold member.

Many forms of mechanism for accomplishing this might be resorted to. In the accompanying drawings I have shown each end of the bench 1 provided with a vertically-movable lifter comprising a cross-bar 29, secured at opposite ends to vertical guide-bars 30, which run in guides or keepers 31, secured to the bench 1 and guides 6, respectively, and the lower ends of these guide-bars 30 are connected together by a cross-bar 32, with which engages the slotted end 33 of a lifter 34, pivoted at 35 to the bottom of bench 1. These two lifters 34 project toward each other, as shown in Fig. 1, and have their contiguous ends flexibly connected to a rod 36, which is pivoted to a treadle 37, whereby the operator may raise both of the lifter-bars 29 by one and the same operation simultaneously. As better shown in Fig. 9, each end of the upper flask or cope 28 is provided with a pair of lateral projections 38 38ª, the latter of which extends outwardly beyond hooks 39, constituting the hinge members of the lower flask, and said projections are so arranged as to be impinged by the lifter-bars 29 when the latter are raised in the manner shown in Fig. 9, thereby lifting the upper flask and mold member clear of the promontories 11ª of the pattern. The projections 38ª are provided with hinge members which seat in the hooks 39, as better shown in Figs. 6 and 7, and these hinge members on the upper flask consist of trunnions 40, formed on or secured to the sides of the projections 38ª and comprising a cone-shaped portion and a smaller or reduced cylindrical portion 41, which fit in complementary surfaces 42 43 (see Fig. 7) in the hooks 39. The trunnions being on the outer sides of the projections 38ª and their smaller ends being turned outwardly, it will therefore be seen that the upper flask will possess a tendency to settle toward a central position, and at the same time the hooks 39 are so formed that they do not catch the sand and prevent accurate registering of the flasks. When the upper flask is raised in the manner shown in Fig. 9, the larger part of the trunnions 40 41 comes against or is in close proximity to the lifter-bars 29, and hence if at this time the upper flask be turned upwardly on an arc in the manner shown in Fig. 10 it will be held against slipping downwardly endwise by the lifter-bars, and if the lifter-bars are lowered while the upper flask is being thus turned it will be seen that the trunnions of the hinge members will again settle back into their seats in the hooks 39, as shown in Fig. 11, and consequently the upper flask may be turned on end, as shown in Fig. 11, and held or supported in that position by the hand of the operator or by any other suitable way without danger of getting the flask out of accurate registration when it is replaced after the pattern has been removed. The end of the flasks opposite the hinges may, if desired, be provided with the usual dowel 42ˣ and dowel-socket 43. The edges of the flasks are formed on an incline, or flaring, the smaller diameter being at the bottom or, more accurately speaking, at the contiguous edges of the flasks when they are together, so that when the sand is being rolled in the flasks the inclined edges will possess a tendency to crowd the sand laterally or inwardly at the bottom, and consequently peen it around the pattern and give it the desired density adjacent to the pattern without the necessity for the employment of special peening implements.

Having thus described my invention, what I claim as new therein, and desire to secure by Letters Patent, is—

1. In a molding-machine, the combination of two flasks, means for supporting the flasks, hinges by which said flasks are connected together at one end, lateral projections extending from the hinge members of the upper flask at one end, and lateral projections at the opposite end of said upper flask, lifters arranged to engage under said projections at both ends and adjacent to the hinge members at one end for raising the upper flask clear of the lower flask, substantially as set forth.

2. In a molding-machine, the combination of two flasks one of which is provided with open hooks having circular seats beveled in one direction, with the greater diameter of the beveled portion of the seats arranged at the outer edge or side of the hook on one side thereof only, hinge members on the other of said flasks having the conical portions 40 adapted to seat in said beveled portions of the hooks, substantially as set forth.

FRED W. HASTINGS.

Witnesses:
C. B. LOOP,
WILLIS L. BROWN.